United States Patent
Ahmed et al.

(10) Patent No.: US 10,581,667 B2
(45) Date of Patent: Mar. 3, 2020

(54) METHOD AND NETWORK NODE FOR LOCALIZING A FAULT CAUSING PERFORMANCE DEGRADATION OF A SERVICE

(71) Applicant: Telefonaktiebolaget LM Ericsson (publ), Stockholm (SE)

(72) Inventors: Jawwad Ahmed, Kista (SE); Yue Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/755,056

(22) PCT Filed: Sep. 3, 2015

(86) PCT No.: PCT/SE2015/050929
§ 371 (c)(1),
(2) Date: Feb. 23, 2018

(87) PCT Pub. No.: WO2017/039506
PCT Pub. Date: Mar. 9, 2017

(65) Prior Publication Data
US 2018/0248745 A1    Aug. 30, 2018

(51) Int. Cl.
*H04L 12/24* (2006.01)
*G06F 11/00* (2006.01)
(Continued)

(52) U.S. Cl.
CPC ........ *H04L 41/0677* (2013.01); *G06F 11/008* (2013.01); *G06F 11/079* (2013.01);
(Continued)

(58) Field of Classification Search
None
See application file for complete search history.

(56) References Cited

U.S. PATENT DOCUMENTS 8,230,051 B1 * 7/2012 Zahavi ............... H04L 41/5009
709/203
8,255,532 B2 * 8/2012 Smith-Mickelson ........................
H04L 43/00
702/182

(Continued)

OTHER PUBLICATIONS

International Search Report and Written Opinion for International Application No. PCT/SE2015/050929, dated May 31, 2016, 11 pages.

(Continued)

*Primary Examiner* — Bunjob Jaroenchonwanit
(74) *Attorney, Agent, or Firm* — NDWE LLP

(57) ABSTRACT

A method and a network node for localizing a fault causing performance degradation of a service. The network node calculates a first, a second and a third set of correlation values for a first time interval. Similarly, the network node calculates a fourth, fifth and sixth correlation value for a second time interval in which the fault has been detected. The sets of correlation values are taken between resource metrics, virtual execution environments, types of said each resource metric and/or servers. When at least one of the absolute values is above the threshold value, the network node adds each resource metric to a list of resource metrics, wherein the list indicates resource metric from which the fault potentially originates. Next, the network node sends the list to an entity configured to manage resources available to the set of servers, thereby enabling the entity to mitigate Service Level Agreement violation.

25 Claims, 3 Drawing Sheets

(51) Int. Cl.
  *G06F 11/07* (2006.01)
  *G06F 11/14* (2006.01)
(52) U.S. Cl.
  CPC ...... *G06F 11/0712* (2013.01); *G06F 11/1484* (2013.01); *H04L 41/5025* (2013.01); *G06F 2201/81* (2013.01)

(56) References Cited

U.S. PATENT DOCUMENTS

| | | | | |
|---|---|---|---|---|
| 8,285,836 | B2* | 10/2012 | Haga | G06F 11/008 709/224 |
| 2008/0016412 | A1 | 1/2008 | White et al. | |
| 2008/0228755 | A1* | 9/2008 | Haga | G06F 11/008 |
| 2009/0116393 | A1* | 5/2009 | Hughes | H04L 45/122 370/238 |
| 2009/0177692 | A1 | 7/2009 | Chagoly et al. | |
| 2010/0299128 | A1* | 11/2010 | Aiber | G06Q 10/10 703/21 |
| 2011/0078300 | A9* | 3/2011 | Grelewicz | G06F 11/3428 709/224 |
| 2011/0145657 | A1* | 6/2011 | Bishop | G06F 11/3495 714/47.1 |
| 2012/0102369 | A1* | 4/2012 | Hiltunen | G06F 11/008 714/48 |
| 2015/0081881 | A1* | 3/2015 | Eaton | H04L 47/785 709/224 |
| 2015/0081882 | A1* | 3/2015 | Bartucca | H04L 47/785 709/224 |
| 2015/0186779 | A1* | 7/2015 | Deng | G06N 7/005 706/47 |
| 2017/0078771 | A1* | 3/2017 | Lingampalli | H04Q 11/0067 |
| 2017/0185464 | A1* | 6/2017 | Lipinski | G06F 11/079 |
| 2017/0230229 | A1* | 8/2017 | Sasturkar | G06F 11/0709 |
| 2018/0013696 | A1* | 1/2018 | Nedeltchev | H04L 43/022 |
| 2018/0083825 | A1* | 3/2018 | Prabhakara | H04L 41/065 |
| 2018/0287902 | A1* | 10/2018 | Chitalia | H04L 43/045 |
| 2018/0367467 | A1* | 12/2018 | Shear | H04L 47/70 |
| 2019/0102717 | A1* | 4/2019 | Wu | G06Q 10/06375 |

OTHER PUBLICATIONS

Bikash Sharma et al., "CloudPD: Problem Determination and Diagnosis in Shared Dynamic Clouds," Jun. 24, 2013, 12 pages, 2013 43rd Annual IEEE/IFIP International Conference on Dependable Systems and Networks (DSN).
Han Hee Song et al., "Q-score: Proactive Service Quality Assessment in a Large IPTV System," Nov. 2-4, 2011, 14 pages, ICM' 11, Berlin, Germany.
Pengfei Chen et al., "An Ensemble MIC-based Approach for Performance Diagnosis in Big Data Platform," 2013, pp. 78-85, 2013 IEEE International Conference on Big Data.
Rerngvit Yanggratoke et al., "Predicting Real-time Service-level Metrics from Device Statistics," 2015, pp. 414-422, 2015 IFIP/IEEE International Symposium on Integrated Network Management (IM2015).
Sidath Handurukande et al., "Magneto Approach to QoS Monitoring," 2011, pp. 209-216, 12th IFIP/IEEE International Symposium on Integrated Network Management 2011.
International Preliminary Report on Patentability for Application No. PCT/SE2015/050929, dated Mar. 15, 2018, 9 pages.

* cited by examiner

METHOD AND NETWORK NODE FOR LOCALIZING A FAULT CAUSING PERFORMANCE DEGRADATION OF A SERVICE

CROSS-REFERENCE TO RELATED APPLICATIONS

This application is a National stage of International Application No. PCT/SE2015/050929, filed Sep. 3, 2015, which is hereby incorporated by reference.

TECHNICAL FIELD

Embodiments herein relate to computer networks, such as core networks of wireless communication systems. In particular, a method and a network node for localizing a fault causing performance degradation of a service are disclosed. A corresponding computer program and a carrier therefor are also disclosed.

BACKGROUND

Next generation services in telecommunication systems are expected to be executed on a so called telecom cloud, which combine the flexibility of today's computing clouds with the service quality of telecommunication systems. Real-time service assurance will become an integral part in transforming the general and flexible cloud into a robust and highly reliable cloud that can ensure low latency and agreed service quality to its customers. The agreed service quality is typically specified in a Servicer Level Agreement (SLA). Therefore, a service assurance system for telecommunication services must be able to detect and preferably also predict problems that may violate the SLA, i.e. problems that may cause SLA violations. This is a complex task already in legacy systems and will become even more challenging when executing the services in the telecom cloud. Furthermore, the service assurance system must be able to diagnose the detected problem. Finally, the service assurance system must be able to remedy, in real time, the problem once it has been detected.

One promising approach to realize the service assurance system is based on machine learning. In such service assurance system, the service quality and behavior is learned from observations of the system. An ambition is to do real-time predictions of the service quality and in case of service quality degradation and/or SLA violations perform a root cause analysis, aka a root cause inference. Thanks to the root cause analysis actions to mitigate the service degradation may be taken. The actions should preferably remedy the detected faults and restore SLA fulfillment as soon as possible to minimize impact of potential penalties due to the SLA violation(s), which in turn results from the service degradation.

In existing service assurance systems, machine learning has been used to build prediction models for service quality assurance. For example, predicting user application quality-of-service (QoS) parameters, quality-of-experience (QoE), and anomalies for complex telecommunication environments. With machine learning, some sample data is used for training a statistical model which later can be used to provide generalized predictions for unseen data. In this way, a mechanism for detection of fault(s), sometime even before the fault(s) have occurred, may be realized.

Predicting the SLA violations, e.g. by means of machine learning, is one tool for enabling delivery of high-quality services. A provider of a telecommunication system can take timely and faster actions based on predictive analysis compared to traditional customer support services. However, this becomes even more useful when coupled with analytics based automated real-time fault localization to diagnose the detected faults. This would have required significantly more effort including human intervention involving more money and time otherwise.

As will be described in more detail below, exiting solutions have limitations, e.g. in terms of accuracy and computation requirements, in the way they attempt to do fault localization.

Some existing solutions are quite simplistic, and thus less accurate. As an example, a simplistic solution may only employ some static threshold mechanisms on performance metrics data collected to detect fault(s) and then employ a manual root cause analysis to localize the fault(s).

Then there are other methods which deploy the less precise and more computation intensive clustering techniques on the system metrics data to detect faults and then do automated fault localization. For example, in "CloudPD: Problem determination and diagnosis in shared dynamic clouds" to Sharma, Bikash, et al., Dependable Systems and Networks (DSN), published at the 43rd Annual Electronics Engineers (IEEE)/International Federation for Information Processing (IFIP) International Conference in 2013, a solution for CouldPD employs a fault detection mechanism which includes localization of faults based on statistical correlation techniques. It uses pairwise correlation computation for metrics within a Virtual Machine (VM) as well as across VMs. This is done for the current interval and the last known good interval from the recent history. If the deviation in correlation value between these two time intervals is bigger than a defined threshold for any metric then that metric is added to a list of culprit metrics and this culprit list is used to build fault signatures to do the fault classification. The time intervals are usually about 15 min.

A problem with this solution may be that the time intervals are too long for some applications, for example during quickly varying load conditions in the network. This may lead to late, or even absent, detection and/or localization of faults, which also delays, or fails to provide, the possibility to take actions to remedy the faults.

In "An ensemble MIC-based approach for performance diagnosis in big data platform" to Chen, Pengfei, Yong Qi, Xinyi Li, and Li Su, published in Big Data, 2013 IEEE International Conference on pp. 78-85, IEEE, 2013, a solution for the CloudPD is proposed for performance diagnosis. During fault localization in this solution Maximum Information Criterion (MIC) is used for establishing correlations between the variables which allows capturing non-linear relationships. The correlations are computed only between the performance metrics locally (1-way), i.e. within one local server machine on a specific data platform, e.g. Hadoop.

There also exist monolithic solutions which combine the fault detection and localization phases in one big operation which hinder scalability of the solution.

SUMMARY

An object may be to improve accuracy of fault localization, e.g. in terms of true positives and false positives as well as true negatives and false negatives.

According to an aspect, the object is achieved by a method for localizing a fault causing performance degradation of a service, wherein the performance degradation is capable of entailing a Service Level Agreement violation. The service is executing on a set of servers utilizing resources. The method comprises receiving a first set of resource metrics indicating state of the resources of the set of servers, wherein the first set of resource metrics relates to a first time interval in which no fault has been detected.

Furthermore, the method comprises, for each resource metric of the first set: calculating a first set of correlation values indicating correlations between said each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server of the set of servers, wherein said each resource metric of the first set relates to the server; calculating a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server; and calculating a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server.

Moreover, the method comprises receiving a second set of resource metrics for indicating state of the resources of the set of servers, wherein the second set of resource metrics relates to a second time interval in which the fault has been detected.

Additionally, the method comprises, for each resource metric of the second set: calculating a fourth set of correlation values indicating correlations between said each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server; calculating a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server; and calculating a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server.

Furthermore, the method comprises calculating absolute values of differences between the first and fourth sets of correlation values, the second and fifth sets of correlation values and the third and sixth sets of correlation values, respectively; comparing the absolute values to a threshold value, wherein at least one of the absolute values of difference is above the threshold value; when said at least one of the absolute values is above the threshold value, adding said each resource metric to a list of resource metrics, wherein the list indicates resource metric from which the fault potentially originates; and sending the list to an entity configured to manage resources available to the set of servers, thereby enabling the entity to mitigate the Service Level Agreement violation.

According to another aspect, the object is achieved by a network node configured for localizing a fault causing performance degradation of a service, wherein the performance degradation is capable of entailing a Service Level Agreement violation. The service is executing on a set of servers utilizing resources.

The network node is configured for: receiving a first set of resource metrics indicating state of the resources of the set of servers, wherein the first set of resource metrics relates to a first time interval in which no fault has been detected.

Furthermore, the network node is configured for, for each resource metric of the first set: calculating a first set of correlation values indicating correlations between said each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server of the set of servers, wherein said each resource metric of the first set relates to the server; calculating a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server; and calculating a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server.

Moreover, the network node is configured for receiving a second set of resource metrics for indicating state of the resources of the set of servers, wherein the second set of resource metrics relates to a second time interval in which the fault has been detected.

Additionally, the network node is configured for, for each resource metric of the second set: calculating a fourth set of correlation values indicating correlations between said each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server; calculating a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server; and calculating a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server.

Furthermore, the network node is configured for: calculating absolute values of differences between the first and fourth sets of correlation values, the second and fifth sets of correlation values and the third and sixth sets of correlation values, respectively; comparing the absolute values to a threshold value, wherein at least one of the absolute values of difference is above the threshold value; when said at least one of the absolute values is above the threshold value, adding said each resource metric to a list of resource metrics, wherein the list indicates resource metric from which the fault potentially originates; and sending the list to an entity configured to manage resources available to the set of servers, thereby enabling the entity to mitigate the Service Level Agreement violation.

According to further aspects, the object is achieved by computer programs and carriers therefor corresponding to the aspects above.

By calculating the first, second, third, fourth, fifth and sixth sets of correlation values between said each resource metric of the respective set and each resource metric of the relevant sub-set of resource metrics, between said each resource metric of the respective set and each resource metric of the relevant sub-set of resource metrics, and between said each resource metric of the respective set and each resource metric of the relevant sub-set of resource metrics, a computation of a 3-way correlation for the set of servers, such as a multi-server cluster, is achieved. Thanks to the computation of the 3-way correlations real faults are identified. Real faults are here distinguished from e.g. change of load in the network, which in existing system may cause false detection of faults, i.e. false positives. For the real faults the correlation values, or at least some of the correlation values out of the first, second, third, fourth, fifth and sixth sets of correlation values, remain stable, e.g. constant at least within some margin, whereas the behaviour of the service may change, e.g. increase of delay in response, no response from service at all, decreased accuracy of service etc. Preferably, all set of correlation values remain stable as explained above in order to more accurately identify the real faults. With the embodiments herein faults across different servers are thus identified.

Therefore, the embodiments herein provide a more robust solution compared to the existing state-of-the-art fault localization techniques which involve only a 1-way or 2-way correlation computations.

Further, the embodiments herein enable successful localization of faults in a shorter time interval as compared to state-of-the-art solutions, especially also under non-steady conditions, in which load on the network is continuously changing.

An advantage is that accuracy of fault localization is increased, e.g. thanks to the use of the 3-way correlation values, i.e. the first, second, third, fourth, fifth and sixth sets of correlation values. Accordingly, the embodiments herein exploit 3-way correlation calculations to find the unstable correlations across different time intervals instead of just 1-way or 2-way correlation calculations. Thereby, achieving a more robust solution for the service hosted on the set of servers, such as one or more multi-server clusters. The embodiments herein enable detection of faults during a relatively short time interval.

Another advantage is that the fault localization method disclosed herein is less computationally expensive and/or requires less computing time as compared to some existing solutions. A reason for this is that the embodiments may evaluate fault over shorter time interval than in existing solutions while still achieving desired accuracy. With a shorter time interval, input data, such as the first and second sets of resource metrics, may thus include fewer samples, such as samples of a particular resource metric. Fewer samples are in this case less demanding to process than higher number of samples. Accordingly, the embodiments herein are less computational expensive and/or require less computing time. For example, with a longer time interval more input data, i.e. higher number of samples, needs to be processed as compared to with a shorter time interval, which thus yields less data, i.e. lower number of samples, to be processed.

A further advantage is that the embodiments herein avoid reporting of simple workload changes or mixed workload changes as faults in the list indicating resource metric from which the fault potentially originates. This is possible thanks to the calculations of the correlation values across three dimensions, i.e. a dimension between said each resource metric of the respective set and each resource metric of the relevant sub-set of resource metrics, another dimension between said each resource metric of the respective set and each resource metric of the relevant sub-set of resource metrics, and a further dimension between said each resource metric of the respective set and each resource metric of the relevant sub-set of resource metrics.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
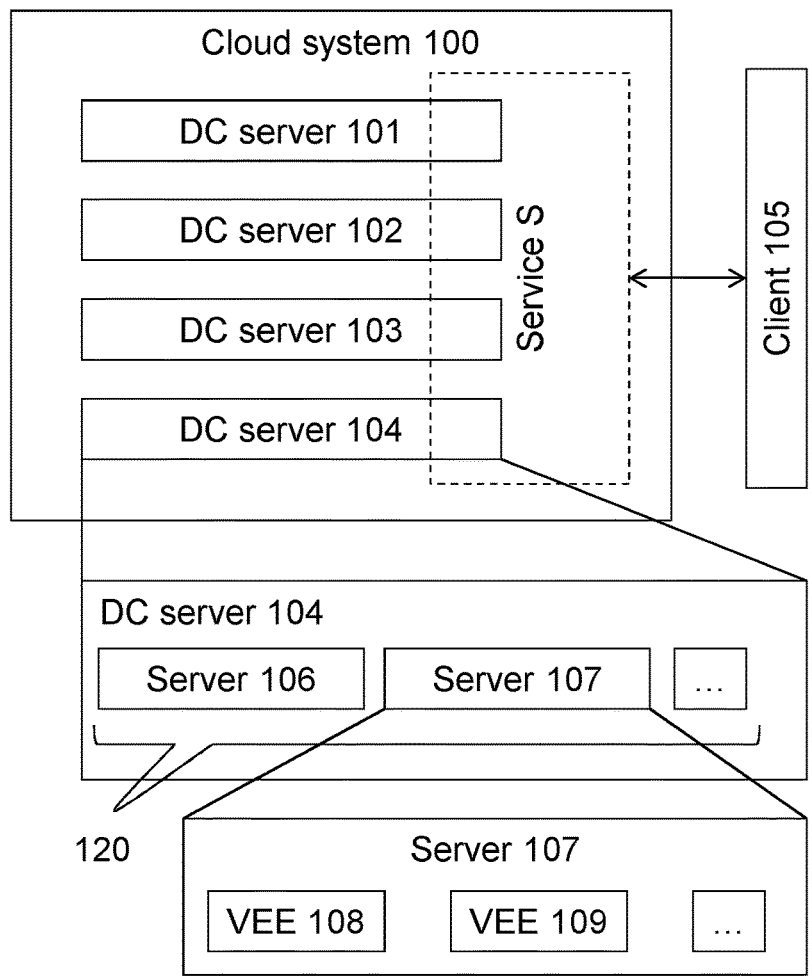
FIG. 1 is a schematic overview of an exemplifying network in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 illustrates a cloud system 100 hosting a service S as an exemplifying scenario. The cloud system 100 comprises a set of Distributed Cluster (DC) servers 101-104 and one or more clients shown as a client 105, such as a VLC client (VLC is not an acronym, but identifies a well-known media client). The client 105 accesses the service S, which executes on one or several of the DC servers 101-104. The service may be a video streaming service, e.g. over Hypertext Transfer Protocol (HTTP). Each DC server 101-104 comprises one or more servers 106, 107, or server machines. Each server machine 106, 107 hosts one or more Virtual Execution Environments (VEE) 108, 109, on which respective instances of the service S are executed. The term "virtual execution environment" may refer to a Virtual Machine (VM), a container, a java virtual machine, a software container or the like. The server machines may host web servers, transcoding instances, networked file systems, etc.

Figure 2:
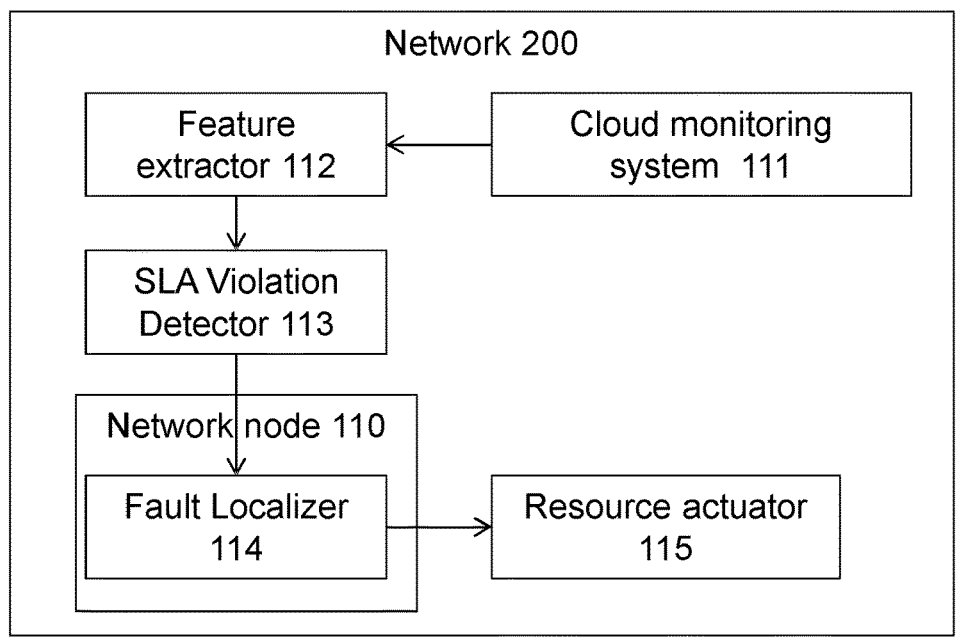
FIG. 2 is a schematic overview of functions in a network node in which embodiments herein may be implemented.

FIG. 2 depicts an exemplifying network 200 in which embodiments herein may be implemented. In this example, the network 200 is a core network of telecommunication system, such as a 2nd generation (2G), 3rd generation (3G) etc. type of telecommunication system. Hence, the network 100 may be part of any cellular or wireless communication system, such as a Long Term Evolution (LTE), Universal Mobile Telecommunication System (UMTS), Global System for Mobilecommunication (GSM) and Worldwide Interoperability for Microwave Access (WiMAX) or the like. The network 200 may be comprised in the cloud system 100.

The network 200 comprises a cloud monitoring system 111, which may collect resource metrics X for each DC server 101-104. The resource metrics may be machine statistics that is obtained from a kernel of an operating system, such as Linux, that runs on the DC server. The kernel gives applications, e.g. providing the service S, access to resources, such as CPU, memory, and network. The resource metrics thus provides values than quantifies status of the resources, e.g. amount of memory available in terms of number of kilobits. The cloud monitoring system 111 may also obtain, from the kernel, detailed information about interrupts, number of running processes, and rate of context switches.

In contrast, service metrics Y on the client 105 side refer to statistics on the application level, for example video frame rates for a video service, response time for a database service, etc.

The resource and service metrics X, Y evolve over time, influenced, e.g., by the load on the cloud system 100, and operating system dynamics. The evolution of the metrics X and Y can be modeled as time series $\{X_t\}$, $\{Y_t\}$ and $\{(X, Y)\}_t$.

Hence, a feature extractor 112 may analyze the time series to extract various features as in existing systems.

In order to detect SLA violations, an SLA violation detector 113 may be employed in the network 200.

Assume that a service level agreement (SLA) has been defined and computed for the service metrics $Y_t$. The SLA at a given time can either be in a 'violated' or 'not violated' state based on the collected service metrics in comparison to the service metrics defined for the SLA. That is, for each service metric $Y_t$ at time t, an $SLA_t$ value may be computed. The objective for the SLA violation detector 113 is to predict, or find out by other means, whether or not the service S may be executed while conforming to the SLA. Note that the method deployed for the SLA violation detector is outside the scope of the present application.

Once an SLA violation (fault) is detected, by the SLA violation detector 113, a fault localizer 114 is responsible for identifying the problematic server 106, 107, or server machine, and for reporting the culprit metric(s) to a resource actuator 115 of the network 200. The embodiments herein provide various implementations of the fault localizer 114, for example when implemented in a network node 110, being comprised in the network 200. Therefore, the terms "fault localizer" and "network node" may be used interchangeably.

Before proceeding in more detail, a brief general description of the fault localizer 114, which as mentioned may be implemented in the network node 110, is provided to facilitate understanding.

The fault localizer 114 finds out in which server the fault(s) has occurred by statistically correlating the resource metrics provided thereto upon a fault event, generated by the SLA violation detector 113. First, the stability of the correlation of resource metrics is evaluated compared to all other metric on the same VM, then to the same resource metric across different VMs on the same server and finally to the same resource metric for the same virtual execution environment situated on other machines, thus assuming a distributed cloud service located on multiple DC servers. These correlation comparisons provide an assessment that if the correlation values in the current (faulty) time interval remain stable as compared to the last known good interval (without fault event) or not. When the correlation values remain stable no fault shall be assumed and instead the fault event is assumed to originate from varying load conditions in the cloud system 100. Therefore, when these correlation values are not stable, i.e. deviates significantly from each other, e.g. by comparing to a threshold value, the resource metric(s) corresponding to the significantly deviating correlation values are marked as culprit.

Figure 3:
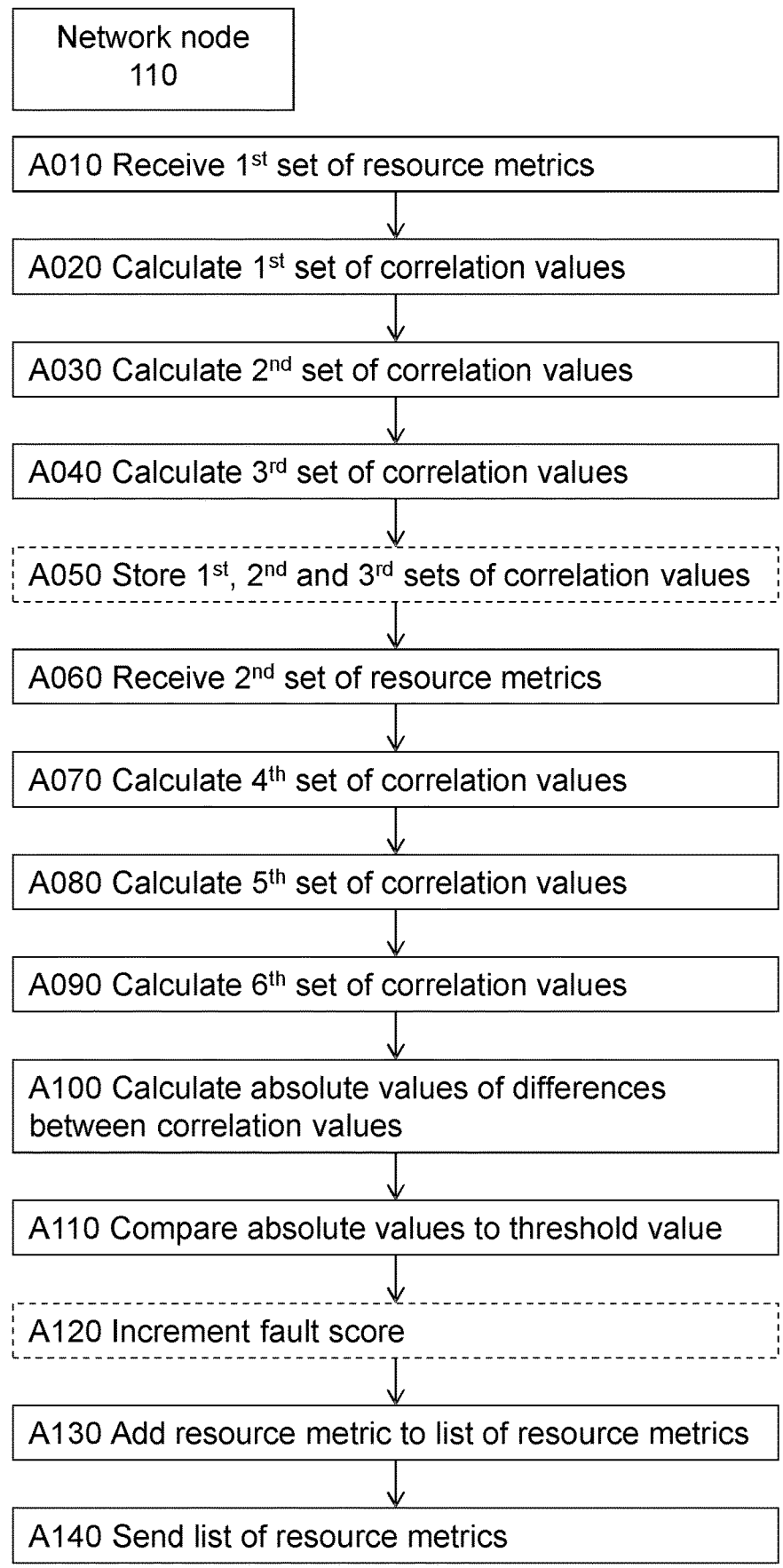
FIG. 3 is a flowchart illustrating embodiments of the method in the network node.

FIG. 3 illustrates an exemplifying method according to embodiments herein when implemented in the network 200 of FIG. 2.

In the following example, the exemplifying method is performed by the network node 110. Thus, the network node 110 performs a method for localizing a fault causing performance degradation of the service S. The performance degradation is capable of entailing a Service Level Agreement violation, i.e. one or more SLA violations. The service is executing on, such as is executed or being executed on, a set of servers 120 utilizing resources. The set of servers 120 may for example be one or more of the servers 106, 107 etc., where the one or more servers 106, 107 may belong to, or may be included in, one or more DC servers 101-104.

One or more of the following actions may be performed in any suitable order.

Initially, an SLA violation is detected in a time interval T, e.g. a second time interval, by the SLA Violation Detector (SVD) 113. Then, an alarm is sent to the Fault Localizer (FL) with the resource metric statistics in the second time interval T and a last known "good interval" $T_{good}$, i.e., a first time interval with no SLA violation. See action A010 and A060.

Action A010

Accordingly, for example when the alarm is sent, the network node 110 receives a first set of resource metrics indicating state of the resources of the set of servers 120. The first set of resource metrics relates to the first time interval in which, as mentioned, no fault has been detected, i.e. it is a "good interval". The state of the resources may be given by measurable values, such as Central Processing Unit (CPU), memory consumption and network bandwidth.

The receiving of the first set of resource metrics may be performed upon expiry of the first time interval.

For each resource metric of the first set, the network node 110 performs actions A020, A030 and A040.

Action A020

The network node 110 calculates a first set of correlation values indicating correlations between said each resource metric of the first set and each resource metric of a first sub-set of resource metrics, the first sub-set being included in the first set of resource metrics.

Said each resource metric of the first sub-set relates to a virtual execution environment of said each resource metric of the first set. This means that the first set of correlation values indicates correlations between resource metrics on the same virtual execution environment.

In addition, said each resource metric of the first sub-set relates to a server 120 of the set of servers 120, wherein said each resource metric of the first set relates to the server 120. Therefore, this means that the first set of correlation values indicates correlations between resource metrics that also pertains to the same server.

Accordingly, as an example, the first set indicates correlations for resource metrics on the same virtual execution environment, same server, but different types of resource metrics. The types of resource metrics include for example CPU usage, memory consumption and network bandwidth as mentioned above.

For each said resource metric of the first set, the first sub-set of resource metrics excludes said each resource metric, thus avoiding calculation of correlation of said each resource metric of the first set with itself.

Action A030

The network node 110 calculates a second set of correlation values indicating correlations between said each resource metric of the first set and each resource metric of a second sub-set of resource metrics, the second sub-set being included in the first set of resource metrics.

Said each resource metric of the second sub-set is of a respective type of said each resource metric of the first set. This means that the second set of correlation values indicates correlations between resource metrics of the same type.

In addition, said each resource metric of the second sub-set relates to the server 120. Therefore, this means that the second set of correlation values indicates correlations between resource metrics that also pertains to the same server.

Accordingly, as an example, the second set indicates correlations for resource metrics of the same type, on the same server, but on different virtual execution environments.

Action A040

The network node 110 calculates a third set of correlation values indicating correlations between said each resource metric of the first set and each resource metric of a third sub-set of resource metrics, the third sub-set being included in the first set of resource metrics.

Said each resource metric of the third sub-set is of the respective type of said each resource metric of the first set. This means that the third set of correlation values indicates correlations between resource metrics of the same type.

In addition, said each resource metric of the third sub-set relates to a respective server of the set of servers being different from the server 120. Therefore, this means that the third set of correlation values indicates correlations between resource metrics on different servers.

Accordingly, as an example, the third set indicates correlations for resource metrics of the same type, but on different servers and on different virtual execution environments.

Action A050

The network node 110 may store the first, second and third sets of correlation values. Hence, in some examples, the first, second and third sets of correlation values may be retrieved from memory instead of being calculated as in action A020, A030 and A040 above. In these examples, the first, second and third set of correlation values are calculated for the most recent time interval in which no fault has been detected.

Action A060

Again, for example when the alarm is sent, the network node 110 receives a second set of resource metrics for indicating state of the resources of the set of servers 120. The second set of resource metrics relates to the second time interval in which, as mentioned, the fault has been detected;

The receiving of the first and second sets of resource metrics, i.e. action A010 and A060, may be performed separately or jointly.

It is preferred that the receiving of the second set of resource metrics is performed upon detection of the fault.

For each resource metric of the second set, the network node 110 performs actions A070, A080 and A090.

Action A070

The network node 110 calculates a fourth set of correlation values indicating correlations between said each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server 120;

The fourth set of correlation values corresponds to the first set of correlation values in that the same correlations are calculated, but the fourth set of correlation values is calculated for the second time interval instead of the first time interval. Reference is made to action A020.

Action A080

The network node 110 calculates a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server 120.

The fifth set of correlation values corresponds to the second set of correlation values in that the same correlations are calculated, but the fifth set of correlation values is calculated for the second time interval instead of the first time interval. Reference is made to action A030.

Action A090

The network node 110 calculates a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server 120.

The sixth set of correlation values corresponds to the third set of correlation values in that the same correlations are calculated, but the sixth set of correlation values is calculated for the second time interval instead of the first time interval. Reference is made to action A040.

Action A100

In order to enable localization of a potential fault, or SLA violation, the network node 110 calculates absolute values of differences between the first and fourth sets of correlation values, the second and fifth sets of correlation values and the third and sixth sets of correlation values, respectively. The absolute values may thus indicate change of each resource metric type correlation value when comparing the first and second time intervals.

Action A110

The network node 110 compares the absolute values to a threshold value. The comparison may indicate to the network node 110 that at least one of the absolute values of difference is above the threshold value. Then, action A120 may be performed. Additionally or alternatively, actions A130 and A140 are performed.

Action A120

In order to achieve a more accurate comparison of each resource metric for the first and second time intervals, a so called fault score may be determined. The fault score keeps track of the sets of correlations. Thus, making sets of the absolute values, where the absolute values of the differences may comprise:

a first set of absolute values relating to the differences between the first and fourth sets of correlation values, a second set of absolute values relating to the differences between the second and fifth sets of correlation values, and a third set of absolute values relating to the differences between the third and sixth sets of correlation values.

Thus, refining action A110 such that when absolute values of at least one of the first, second and third sets of absolute values are above the threshold value, the network node 110 may increment, for each resource metric of the first and second sets, the respective fault score for said each resource metric of the first and second sets.

In some embodiments, all of the first, second and third sets of absolute values may be above the threshold value, when performing the incrementing A120 of the fault score for said each resource metric of the first and second sets.

When action A120 is performed, a culprit resource metric is only marked after calculating its correlation instability across all other metrics and devising a "metric fault score" based on it. If the stability score is above a certain threshold then the metric i marked as culprit.

An alternative manner of describing actions A020, A030, A040, A070, A080, A090, A100, A110 and A130 as well as optional action A120, is presented below. In this example, $T_{good}$ and $T_{bad}$ are handled in parallel, for each resource metric. $T_{good}$ corresponds to the first time interval and $T_{bad}$ corresponds to the second time interval. "Corr( )" refers to a computation of Pearson correlation of the input values.

1) For each metric i:

A Metric_Fault_Score variable for each metric i is initially cleared, e.g. assigned a value of zero.

a. For every other metric j on the same VM and cluster server machine as i does:
   i. compute the correlation value of i with j in the interval T and $T_{good}$: Corr(i, j, T) and Corr(i, j, $T_{good}$) respectively
   ii. compute the absolute value of difference of correlation values between the intervals T and $T_{good}$: $Corr_{i,\ j,\ diff}$=abs(Corr(i, j, T)−Corr(i, j, $T_{good}$))
   iii. if($Corr_{i,\ j,\ diff}$>Thrsh) then update the Metric_Fault_Score$_i$ for i as:

Metric_Fault_Score$_i$+:=$Corr_{i,j,diff}$ b. For every other metric k where k is the same metric type as i but available on a different VM on the same server machine as i do:
   i. compute the correlation value of i with k in the interval T and $T_{good}$: Corr(i, k, T) and Corr(i, k, $T_{good}$) respectively
   ii. compute the absolute value of difference of correlation values between the intervals T and $T_{good}$: $Corr_{i,\ k,\ diff}$=abs(Corr(i, k, T)−Corr(i, k, $T_{good}$))
   iii. if($Corr_{i,\ k,\ diff}$>Thrsh) then update the Metric_Fault_Score$_i$ for i as:

Metric_Fault_Score$_i$+:=$Corr_{i,k,diff}$ c. For every other metric l where i is the same metric type as i but available on a different VM and on a different server machine as i do:
   i. compute the correlation value of i with l in the interval T and $T_{good}$: Corr(i, l, T) and Corr(i, l, $T_{good}$) respectively
   ii. compute the absolute value of difference of correlation values between the intervals T and $T_{good}$: $Corr_{i,\ l,\ diff}$=abs(Corr(i, l, T)−Corr(i, l, $T_{good}$))
   iii. if($Corr_{i,\ l,\ diff}$>Thrsh) then update the Metric_Fault_Score$_i$ for i as:

Metric_Fault_Score$_i$+:=$Corr_{i,l,diff}$

2) For each metric i for all VMs on the application server cluster if (Metric_Fault_Score$_i$>Thrsh$_{FaultScore}$) then add to the list of CulpritMetrics. See also action A130 below in case the fault score is not calculated.

Note that Thrsh and Thrsh$_{FaultScore}$ are thresholds which can be assigned different values (range between 0 to 2.0) to tune the performance of the algorithm. From our experimentation, a value of 0.4 for Thrsh and a value of 0.5 for Thrsh$_{FaultScore}$ work very well. The functionality of the method is visualized with different steps in FIG. 3.

Action A130

When said at least one of the absolute values is above the threshold value, the network node 110 adds said each resource metric to a list of resource metrics, wherein the list indicates resource metric from which the fault potentially originates.

The adding of said each resource metric to the list may be performed when the fault score is above a fault score threshold value for indicating when to add resource metrics to the list.

In some embodiments, the threshold value may comprise:

a first threshold value for the differences of correlation between the first and fourth sets of correlation values, a second threshold value for the differences of correlation between the second and fifth sets of correlation values, and a third threshold value for the differences between the third and sixth sets of correlation values.

In these embodiments, the first, second and third threshold values may be equal to each other, or at least one of the first, second and third threshold values may be different from at least one other threshold value among the first, second and third threshold values.

Action A140

The network node 110 sends the list to an entity 115 configured to manage resources available to the set of servers, thereby enabling the entity 115 to mitigate the Service Level Agreement violation.

The correlation may refer to non-linear correlation or linear correlation.

The virtual execution environment of said each resource metric of the first set may comprise a virtual machine relating to said each resource metric of the first set or a software container relating to of said each resource metric of the first set, and/or the virtual execution environment of said each resource metric of the second set may comprise a virtual machine relating to said each resource metric of the second set or a software container relating to of said each resource metric of the second set.

According to the embodiments herein a systematic approach, where fault detection and fault localization are decoupled, is provided. Specifically, the fault localization method, i.e. the method for localizing the fault causing performance degradation of the service, is agnostic to the detection of faults in the cloud system so that a mitigation action can be decided and executed later on.

The embodiments herein are highly scalable thanks to the fact that the fault localizer is coupled from the fault detector. Such a layered system will be scalable, because the fault localizer will be invoked only if there is a fault detected by the fault detector as compared to a monolithic solution which combines these two aspects.

Moreover, the embodiments herein enable good extensibility as the fault localizer is not tied to any specific fault detector. The fault localizer may be used together with any other fault detection technique, which for example is not based on predictive analytics or manual fault detection.

Furthermore, the network node according to the embodiments herein, e.g. the fault localizer, may e.g. detect a memory leakage problem on multiple servers in the set of servers, which memory leakage problem persists across at least the second time interval. As mentioned before, thanks to the fact that the correlation values are calculated across at least three dimensions, the considered time intervals may be short, e.g. approximately 5 minutes, in comparison to existing solutions, e.g. 15 minutes and more. This means that fewer samples of e.g. the first and second sets of resources metrics are required with the presented solution.

This invention describes an automated fault localization system for the Telecom clouds which exploits the unsupervised machine learning techniques to localize the detected faults for cluster based distributed services provisioned in the cloud. The proposed solution can differentiate between the simple cloud workload changes and "real faults". Proposed method does not require any training and can be coupled with any fault detection mechanism. Also the robustness of the solution results in detecting the problems in relatively small time intervals, such as a few minutes span, instead of in a longer time span, such as 15 minutes or more, as in existing solutions.

This invention describes an automated fault localization system for the Telecom clouds which exploits the unsupervised machine learning techniques to localize the detected faults for cluster based distributed services provisioned in the cloud. Proposed solution can differentiate between the simple cloud workload changes and "real faults". The proposed method does not require any training phase (and training data) and can be coupled in principal with any fault detection mechanism. For example, fault detection may be done by using supervised machine learning, unsupervised methods or simple static resource threshold based violation detection techniques. Such a modular and layered approach to fault detection encourages scalability as compared to traditional monolithic solutions.

In the following, some observations to aid in implementing the embodiments are provided.

Machine Learning

Machine learning refers to the task of predicting unseen samples based on the currently available examples using statistical learning techniques. Predictions can broadly be categorized into a classification problem and regression problem. Machine learning methods can in general also be categorized as either supervised or unsupervised. For supervised learning the labeled input data is accompanied with expected output while unsupervised learning takes unlabeled data as input. Many classical statistical and machine learning methods fall into supervised learning methodology. Below first we briefly review a set of supervised methods that can be deployed for service quality predictions within the fault detector, such as a monolithic fault detector, described herein.

Supervised Machine Learning

Logistic regression is a common method for solving classification problems. It specifies the log-odds posterior probability for the classes and takes positive or negative real numbers as input, while output values are either zero or one. It can hence be interpreted as the posterior probability of drawing a sample from the respective class. The coefficients of the model can efficiently be trained using Stochastic Gradient Decent (SGD) which makes it suitable for online applications. An online version is the Gradient Ascent Logistic Regression.

Another family of classifiers is decision trees, where the feature space is split into a set of regions based on one or more homogeneity criteria recursively until there is no more significant gain in terms of homogeneity of the members of each class. The benefit of decision trees over linear methods is that they perform well even when the inherent relationship between the predictors and the response variable is non-linear. And non-parametric property means that no assumptions are made on the form or shape of the true underlying function. The cost of making a decision is dependent on the height of the tree which is logarithmic in the size of tree.

Decision trees are flexible and have low bias but may lead to high variance in predictions in many cases. However, studies have shown that their effectiveness can be significantly increased when used as a base component for the ensembles such as bagging or random forest.

Unsupervised Machine Learning

The fault classifier module, described above, may use unsupervised machine learning. A major advantage is that no training is required beforehand and method works in an online manner.

In order to define correlation and calculate correlation, the following description is provided.

Correlation refers to the relationship or dependence between two data sets. A correlation refers to the high dependence and relationship between the two data sets, whereas no or little correlation refers to low dependence and relationship between the two data sets. There are different ways to calculate the correlation between the data sets, but the most popular way is the Pearson correlation coefficient. It is obtained by dividing the covariance of the two variables by the product of their standard deviations. Pearson correlation coefficient is sensitive only to linear relationships between the variables.

Depending on the application if the nonlinear relationship needs to be captured then some newer publications propose the use of MIC (i.e. Maximum Information Criterion) to quantify the relationship between the two variables.

In the examples herein, the Pearson correlation coefficient has been used to calculate the relationship between the variables, i.e. the first through sixth set of correlation values, due to its common use. However, the embodiments herein are independent of which method is used for calculating the correlations to establish relationship(s) between the first through sixth set of correlation values.

Correlation Stability Across Workload Changes

With the embodiments herein, it is assumed that workload changes and workload mixes may change the behavior of the service, being monitored, but the correlation values for different performance metric collected at the servers providing the service should remain stable. That is correlation values will significantly change only if there is indeed a fault in the system.

As mentioned before, the embodiments herein advantageously increases accuracy of fault localization by using 3-way correlations, e.g. between resource metric, between peer VM and between peer Physical Machine (PM)) for the services.

Additionally, the embodiments herein may be more robust when the total number of violations and magnitude of violations are taking into account when deciding on the culprit metrics, i.e. when adding resource metric(s) to the list as in action A130.

Figure 4:
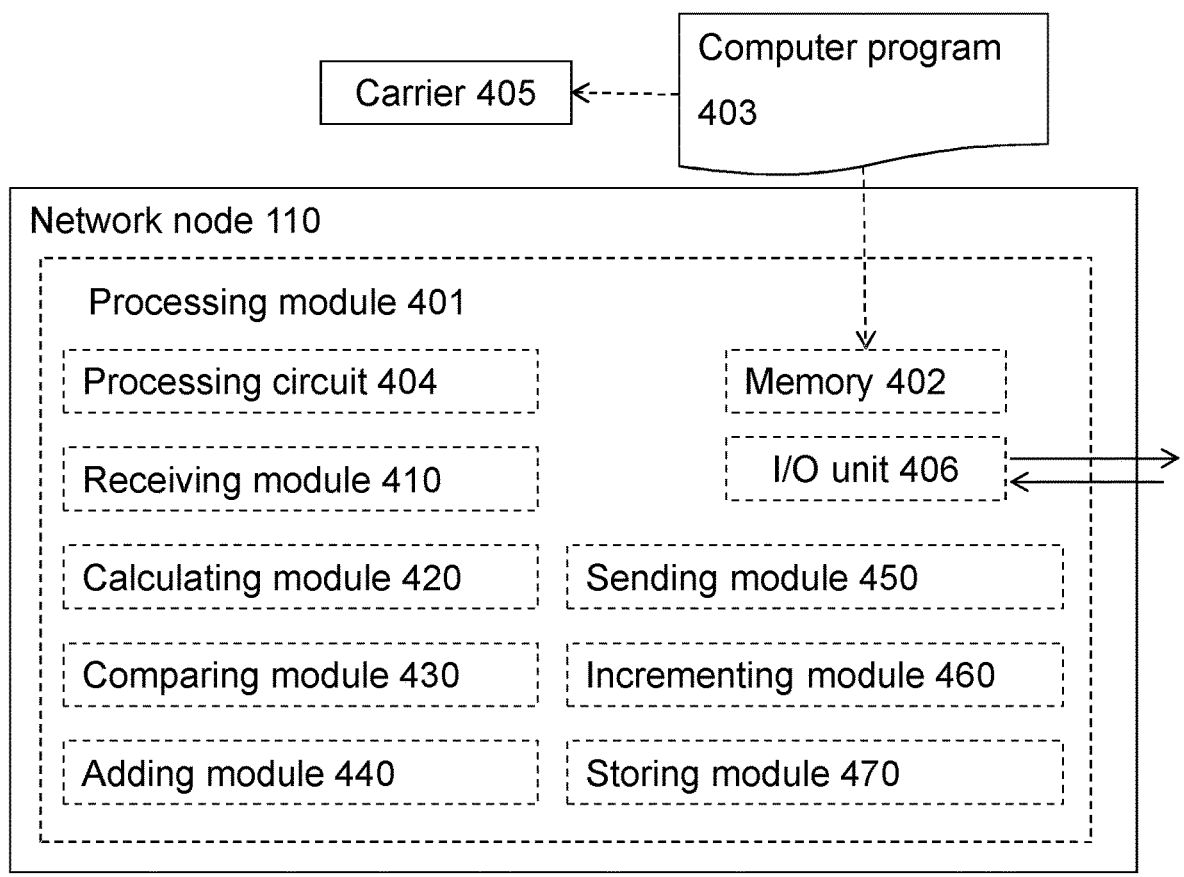
FIG. 4 is a block diagram illustrating embodiments of the network node.

With reference to FIG. 4, a schematic block diagram of embodiments of the network node 110 of FIG. 1 is shown.

The network node 110 may comprise a processing module 401, such as a means, one or more hardware modules and/or one or more software modules for performing the methods described herein.

The network node 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the network node 110 is operative to perform the methods of FIG. 3.

In some other embodiments, the computer readable code units may cause the network node 110 to perform the method according to FIG. 3 when the computer readable code units are executed by the network node 110.

FIG. 4 further illustrates a carrier 405, or program carrier, which comprises the computer program 403 as described directly above.

In some embodiments, the processing module 401 comprises an Input/Output unit 406, which may be exemplified by a receiving module and/or a sending module as described below when applicable.

In further embodiments, the processing module 401 may comprise one or more of a receiving module 410, a calculating module 420, a comparing module 430, an adding module 440, a sending module 450, an incrementing module 460, and a storing module 470 as exemplifying hardware modules. In other examples, one or more of the aforementioned exemplifying hardware modules may be implemented as one or more software modules.

Accordingly, the network node 110 is configured for localizing a fault causing performance degradation of a service, wherein the performance degradation is capable of entailing a Service Level Agreement violation, wherein the service is executing on a set of servers 120 utilizing resources.

Therefore, according to the various embodiments described above, the network node 110, the processing module 401 and/or the receiving module 410 is configured for receiving a first set of resource metrics indicating state of the resources of the set of servers 120, wherein the first set of resource metrics relates to a first time interval in which no fault has been detected.

Furthermore, the network node 110, the processing module 401 and/or the calculating module 420 is configured for, for each resource metric of the first set:

calculating a first set of correlation values indicating correlations between said each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server 120 of the set of servers 120, wherein said each resource metric of the first set relates to the server 120;

calculating a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server 120; and calculating a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server 120.

Moreover, the network node 110, the processing module 401 and/or the receiving module 410 is configured for receiving a second set of resource metrics for indicating state of the resources of the set of servers 120, wherein the second set of resource metrics relates to a second time interval in which the fault has been detected.

Additionally, the network node 110, the processing module 401 and/or the calculating module 420, or a further calculating module (not shown), is configured for, for each resource metric of the second set:

calculating a fourth set of correlation values indicating correlations between said each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server 120;

calculating a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server 120; and calculating a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server 120.

Furthermore, the network node 110, the processing module 401 and/or the calculating module 420, or a still further calculating module (not shown), is configured for: calculating absolute values of differences between the first and fourth sets of correlation values, the second and fifth sets of correlation values and the third and sixth sets of correlation values, respectively.

Moreover, the network node 110, the processing module 401 and/or the comparing module 430 is configured for comparing the absolute values to a threshold value, wherein at least one of the absolute values of difference is above the threshold value.

Additionally, the network node 110, the processing module 401 and/or the adding module 440 is configured for adding said each resource metric to a list of resource metrics, when said at least one of the absolute values is above the threshold value. The list indicates resource metrics from which the fault potentially originates.

Finally, the network node 110, the processing module 401 and/or the sending module 450 is configured for sending the list to an entity 115 configured to manage resources available to the set of servers, thereby enabling the entity 115 to mitigate the Service Level Agreement violation.

The absolute values of the differences may comprise:
a first set of absolute values relating to the differences between the first and fourth sets of correlation values,
a second set of absolute values relating to the differences between the second and fifth sets of correlation values, and
a third set of absolute values relating to the differences between the third and sixth sets of correlation values.

The network node 110, the processing module 401 and/or the incrementing module 460 is configured for, for each resource metric of the first and second sets, incrementing a fault score for said each resource metric of the first and second sets, when absolute values of at least one of the first, second and third sets of absolute values are above the threshold value.

Furthermore, the network node 110, the processing module 401 and/or the adding module 440, may be configured for performing the adding of said each resource metric to the list when the fault score is above a fault score threshold value for indicating when to add resource metrics to the list.

In some embodiments, all of the first, second and third sets of absolute values may be above the threshold value, when performing the incrementing of the fault score for said each resource metric of the first and second sets.

In some embodiments, the threshold value may comprise:
a first threshold value for the differences of correlation between the first and fourth sets of correlation values,
a second threshold value for the differences of correlation between the second and fifth sets of correlation values, and
a third threshold value for the differences between the third and sixth sets of correlation values.

In these embodiments, the first, second and third threshold values may be equal to each other, or at least one of the first, second and third threshold values may be different from at least one other threshold value among the first, second and third threshold values.

The correlation may refer to non-linear correlation or linear correlation.

The network node 110, the processing module 401 and/or the receiving module 410 may be configured for performing the receiving of the first and second sets of resource metrics separately or jointly.

The network node 110, the processing module 401 and/or the receiving module 410 may be configured for performing the receiving of the first set of resource metrics upon expiry of the first time interval.

The network node 110, the processing module 401 and/or the storing module 470 may be configured for storing the first, second and third sets of correlation values.

The network node 110, the processing module 401 and/or the receiving module 410 may be configured for performing the receiving of the second set of resource metrics upon detection of the fault.

The virtual execution environment of said each resource metric of the first set may comprise a virtual machine relating to said each resource metric of the first set or a software container relating to of said each resource metric of the first set, and/or the virtual execution environment of said each resource metric of the second set may comprise a virtual machine relating to said each resource metric of the second set or a software container relating to of said each resource metric of the second set.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed in a network, for localizing a fault causing performance degradation of a service, wherein the performance degradation is capable of entailing a Service Level Agreement violation for the service, and wherein the service is executing on a set of servers utilizing resources of the set of servers, the method comprising:
   receiving a first set of resource metrics indicating state of the resources of the set of servers, wherein the first set of resource metrics relates to a first time interval in which no fault has been detected;
   wherein for each resource metric of the first set:
      calculating a first set of correlation values indicating correlations between each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server of the set of servers, wherein said each resource metric of the first set relates to the server;
      calculating a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server; and
      calculating a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server;
   receiving a second set of resource metrics for indicating state of the resources of the set of servers, wherein the second set of resource metrics relates to a second time interval in which the fault has been detected;
   wherein for each resource metric of the second set:
      calculating a fourth set of correlation values indicating correlations between each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server;
      calculating a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server; and calculating a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server;

calculating absolute values of differences between the first and fourth sets of correlation values, the second and fifth sets of correlation values and the third and sixth sets of correlation values, respectively;

comparing the absolute values to a threshold value, wherein at least one of the absolute values of difference is above the threshold value;

when said at least one of the absolute values is above the threshold value, adding said each resource metric to a list of resource metrics, wherein the list indicates resource metric from which the fault potentially originates; and based on the list, managing the resources of the set of servers to cause the resources to change to mitigate the Service Level Agreement violation.

2. The method according to claim 1, wherein the absolute values of the differences comprise:
 a first set of absolute values relating to differences between the first and fourth sets of correlation values,
 a second set of absolute values relating to differences between the second and fifth sets of correlation values, and
 a third set of absolute values relating to differences between the third and sixth sets of correlation values,
 wherein, for each resource metric of the first and second sets, when absolute values of at least one of the first, second and third sets of absolute values are above the threshold value, incrementing a fault score for said each resource metric of the first and second sets, and wherein the adding of said each resource metric to the list is performed, when the fault score is above a fault score threshold value for indicating when to add resource metrics to the list.

3. The method according to claim 2, wherein all of the first, second and third sets of absolute values are above the threshold value, when performing the incrementing of the fault score for said each resource metric of the first and second sets.

4. The method according to claim 1, wherein the threshold value comprises:
 a first threshold value for differences of correlation between the first and fourth sets of correlation values,
 a second threshold value for differences of correlation between the second and fifth sets of correlation values, and
 a third threshold value for differences between the third and sixth sets of correlation values.

5. The method according to claim 4, wherein the first, second and third threshold values are equal to each other, or wherein at least one of the first, second and third threshold values is different from at least one other threshold value among the first, second and third threshold values.

6. The method according to claim 1, wherein the correlation refers to non-linear correlation or linear correlation.

7. The method according to claim 1, wherein the receiving of the first and second sets of resource metrics is performed separately or jointly.

8. The method according to claim 1, wherein receiving of the first set of resource metrics is performed upon expiry of the first time interval.

9. The method according to claim 1, wherein the method further comprises storing the first, second and third sets of correlation values.

10. The method according to claim 1, wherein the receiving of the second set of resource metrics is performed upon detection of the fault.

11. The method according to claim 1, wherein the virtual execution environment of said each resource metric of the first set comprises a virtual machine relating to said each resource metric of the first set or a software container relating to said each resource metric of the first set, and wherein the virtual execution environment of said each resource metric of the second set comprises a virtual machine relating to said each resource metric of the second set or a software container relating to said each resource metric of the second set.

12. The method according to claim 1, wherein the method is performed by a network node.

13. A network for localizing a fault causing performance degradation of a service, wherein the performance degradation is capable of entailing a Service Level Agreement violation for the service, and wherein the service is executing on a set of servers utilizing resources of the set of servers, the network comprising:
 a processor; and
 a memory containing instructions which, when executed by the processor, cause a network node to perform operations to:
   receive a first set of resource metrics indicating state of the resources of the set of servers, wherein the first set of resource metrics relates to a first time interval in which no fault has been detected;
   wherein the instructions which, when executed by the processor, cause the network node, for each resource metric of the first set, to perform operations to:
     calculate a first set of correlation values indicating correlations between each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server of the set of servers, wherein said each resource metric of the first set relates to the server;
     calculate a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server; and
     calculate a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server;

wherein the instructions which, when executed by the processor, further cause the network node to receive a second set of resource metrics for indicating state of the resources of the set of servers, wherein the second set of resource metrics relates to a second time interval in which the fault has been detected;

wherein the instructions which, when executed by the processor, cause the network node, for each resource metric of the second set, to perform operations to:

calculate a fourth set of correlation values indicating correlations between each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server;

calculate a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server; and calculate a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server;

wherein the instructions which, when executed by the processor, further cause the network node to perform operations to:

calculate absolute values of differences between the first and fourth sets of correlation values, the second and fifth sets of correlation values and the third and sixth sets of correlation values, respectively;

compare the absolute values to a threshold value, wherein at least one of the absolute values of difference is above the threshold value;

when said at least one of the absolute values is above the threshold value, add said each resource metric to a list of resource metrics, wherein the list indicates resource metric from which the fault potentially originates; and an entity configured to manage the resources of the set of servers to use the list to cause the resources to change to mitigate the Service Level Agreement violation.

14. The network according to claim 13, wherein the absolute values of the differences comprise:
a first set of absolute values relating to differences between the first and fourth sets of correlation values,
a second set of absolute values relating to differences between the second and fifth sets of correlation values, and
a third set of absolute values relating to differences between the third and sixth sets of correlation values, wherein the network node further performs operations, for each resource metric of the first and second sets, to increment a fault score for said each resource metric of the first and second sets, when absolute values of at least one of the first, second and third sets of absolute values are above the threshold value, and wherein the network node further performs operations to add said each resource metric to the list, when the fault score is above a fault score threshold value for indicating when to add resource metrics to the list.

15. The network according to claim 14, wherein all of the first, second and third sets of absolute values are above the threshold value, when performing operations to increment the fault score for said each resource metric of the first and second sets.

16. The network according to claim 13, wherein the threshold value comprises:
a first threshold value for differences of correlation between the first and fourth sets of correlation values,
a second threshold value for differences of correlation between the second and fifth sets of correlation values, and
a third threshold value for differences between the third and sixth sets of correlation values.

17. The network according to claim 16, wherein the first, second and third threshold values are equal to each other, or wherein at least one of the first, second and third threshold values is different from at least one other threshold value among the first, second and third threshold values.

18. The network according to claim 13, wherein the correlation refers to non-linear correlation or linear correlation.

19. The network according to claim 13, wherein the network node performs operations to receive the first and second sets of resource metrics separately or jointly.

20. The network according to claim 13, wherein the network node performs operations to receive the first set of resource metrics upon expiry of the first time interval.

21. The network according to claim 13, wherein the network node performs operations to store the first, second and third sets of correlation values.

22. The network according to claim 13, wherein the network node performs operations to receive the second set of resource metrics upon detection of the fault.

23. The network according to claim 13, wherein the virtual execution environment of said each resource metric of the first set comprises a virtual machine relating to said each resource metric of the first set or a software container relating to said each resource metric of the first set, and wherein the virtual execution environment of said each resource metric of the second set comprises a virtual machine relating to said each resource metric of the second set or a software container relating to said each resource metric of the second set.

24. A non-transitory computer readable storage medium having stored thereon a computer program comprising computer readable code which, when executed on a processor, cause a network to perform operations for localizing a fault causing performance degradation of a service, wherein the performance degradation is capable of entailing a Service Level Agreement violation for the service, and wherein the service is executing on a set of servers utilizing resources of the set of servers, the operations comprising:

receiving a first set of resource metrics indicating state of the resources of the set of servers, wherein the first set of resource metrics relates to a first time interval in which no fault has been detected;

wherein for each resource metric of the first set:

calculating a first set of correlation values indicating correlations between each resource metric of the first set and each resource metric of a first sub-set of resource metrics, the first sub-set being included in the first set of resource metrics, wherein said each resource metric of the first sub-set relates to a virtual execution environment of said each resource metric of the first set, and wherein said each resource metric of the first sub-set relates to a server of the set of servers, wherein said each resource metric of the first set relates to the server;

calculating a second set of correlation values indicating correlations between said each resource metric of the first set and each resource metric of a second sub-set of resource metrics, the second sub-set being included in the first set of resource metrics, wherein said each resource metric of the second sub-set is of a respective type of said each resource metric of the first set, and wherein said each resource metric of the second sub-set relates to the server; and calculating a third set of correlation values indicating correlations between said each resource metric of the first set and each resource metric of a third sub-set of resource metrics, the third sub-set being included in the first set of resource metrics, wherein said each resource metric of the third sub-set is of the respective type of said each resource metric of the first set, and wherein said each resource metric of the third sub-set relates to a respective server of the set of servers being different from the server;

receiving a second set of resource metrics for indicating state of the resources of the set of servers, wherein the second set of resource metrics relates to a second time interval in which the fault has been detected;

wherein for each resource metric of the second set:

calculating a fourth set of correlation values indicating correlations between each resource metric of the second set and each resource metric of a fourth sub-set of resource metrics, the fourth sub-set being included in the second set of resource metrics, wherein said each resource metric of the fourth sub-set relates to a virtual execution environment of said each resource metric of the second set, and wherein said each resource metric of the second set relates to the server;

calculating a fifth set of correlation values indicating correlations between said each resource metric of the second set and each resource metric of a fifth sub-set of resource metrics, the fifth sub-set being included in the second set of resource metrics, wherein said each resource metric of the fifth sub-set is of a respective type of said each resource metric of the second set, and wherein said each resource metric of the fifth sub-set relates to the server; and calculating a sixth set of correlation values indicating correlations between said each resource metric of the second set and each resource metric of a sixth sub-set of resource metrics, the sixth sub-set being included in the second set of resource metrics, wherein said each resource metric of the sixth sub-set is of the respective type of said each resource metric of the second set, and wherein said each resource metric of the sixth sub-set relates to a respective server of the set of servers being different from the server;

calculating absolute values of differences between the first and fourth sets of correlation values, the second and fifth sets of correlation values and the third and sixth sets of correlation values, respectively;

comparing the absolute values to a threshold value, wherein at least one of the absolute values of difference is above the threshold value;

when said at least one of the absolute values is above the threshold value, adding said each resource metric to a list of resource metrics, wherein the list indicates resource metric from which the fault potentially originates; and based on the list, managing the resources of the set of servers to cause the resources to change to mitigate the Service Level Agreement violation.

25. The non-transitory computer readable storage medium of claim 24, wherein the computer program comprising computer readable code cause the network to further perform operations where the absolute values of the differences comprise:

a first set of absolute values relating to differences between the first and fourth sets of correlation values;

a second set of absolute values relating to differences between the second and fifth sets of correlation values; and a third set of absolute values relating to differences between the third and sixth sets of correlation values;

wherein, for each resource metric of the first and second sets, when absolute values of at least one of the first, second and third sets of absolute values are above the threshold value, incrementing a fault score for said each resource metric of the first and second sets, and wherein the adding of said each resource metric to the list is performed when the fault score is above a fault score threshold value for indicating when to add resource metrics to the list.

\* \* \* \* \*